(12) United States Patent
Joshi et al.

(10) Patent No.: US 6,532,427 B1
(45) Date of Patent: Mar. 11, 2003

(54) WEB-BASED MINING OF STATISTICAL DATA

(75) Inventors: Madhukar Joshi, Nashua, NH (US); Scott Paiva, Nashua, NH (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/853,089

(22) Filed: May 10, 2001

Related U.S. Application Data

(60) Provisional application No. 60/203,008, filed on May 10, 2000.

(51) Int. Cl.[7] ............................................. G06F 19/00
(52) U.S. Cl. .......................................... 702/84; 700/108
(58) Field of Search ............................. 709/225; 702/84; 700/108; 695/600; 382/141

(56) References Cited

U.S. PATENT DOCUMENTS

| | | | | |
|---|---|---|---|---|
| 5,548,756 A | * | 8/1996 | Tantry et al. ................ | 695/600 |
| 5,974,167 A | * | 10/1999 | Reszler ....................... | 382/141 |
| 6,243,615 B1 | * | 6/2001 | Neway et al. .............. | 700/108 |
| 2002/0052954 A1 | * | 5/2002 | Polizzi et al. ............... | 709/225 |

OTHER PUBLICATIONS

SAS Institute Inc., "Software by Product", www.sas.com/products/index.html, (2001).
PRI Automation, "PROMIS Software Dependable Productivity to Meet Your Most Critical Manufacturing Challenges" http://www.pria.com/products/fms/promis/pr_fms_promis_index.htm, (2000).

* cited by examiner

*Primary Examiner*—John Barlow
*Assistant Examiner*—Xiuqin Sun
(74) *Attorney, Agent, or Firm*—W. Daniel Swayze, Jr.; W. James Brady; Frederick J. Telecky, Jr.

(57) ABSTRACT

A statistical process control information system includes a process information system (process IS) and an analysis information system (analysis IS). The analysis IS generates a script file and a command file. The script file includes responses to command-line queries generated by a process data extraction program, and the command file includes commands for invoking the process data extraction program and copying an extracted data file to the analysis IS. The analysis IS issues a command to the process IS to execute an extraction command routine, causing the process IS to copy and execute the command file. The analysis IS performs statistical analysis on the extracted data file and creates graphical SPC chart files, including a hypertext summary, and these are posted in a network-accessible database for users.

7 Claims, 3 Drawing Sheets

WEB-BASED MINING OF STATISTICAL DATA

CROSS REFERENCE TO RELATED APPLICATIONS

This application claims priority under 35 U.S.C. §119(e) of U.S. Provisional application No. 60/203,008, filed May 10, 2000.

STATEMENT REGARDING FEDERALLY SPONSORED RESEARCH OR DEVELOPMENT

Not Applicable

REFERENCE TO COMPUTER PROGRAM LISTING APPENDIX

This application includes a computer program listing appendix submitted on a compact disc. The listing resides in an ASCII text file entitle "CD_ALL.TXT", size 35 Kbytes, created May 10, 2001. The contents of this computer program listing are incorporated in this application by reference.

BACKGROUND OF THE INVENTION

The present invention is related to the field of data mining, and in particular to tools for automating the collection, analysis, and presentation of data such as manufacturing process control data.

Tools for collecting, storing and retrieving data pertaining to manufacturing processes have been known. In the semiconductor industry, for example, a tool known by the trade mark PROMIS has been used for different manufacturing-related data. In particular, PROMIS has been used to track so-called "critical dimension" or CD data, which results from measurement of critical dimensions such as line widths on wafers and die before and after various processing steps. Process engineers and others use this information to monitor and tune manufacturing processes for proper performance.

Additionally, other tools have existed for performing analysis of the type of data that has been gathered by tools such as PROMIS. Of particular use in a manufacturing operation are tools for statistical process control. One widely used statistical analysis tool is known by the acronym SAS, which stands for Statistical Analysis Software. SAS includes functionality enabling it to perform very sophisticated analysis that is specialized to statistical studies.

PROMIS can be characterized as a "legacy" application, due to its longevity and original deployment on minicomputers such as those previously sold by Digital Equipment Corporation, formerly of Maynard, Mass., USA. The application software and database reside on a centralized general-purpose computer, such as an ALPHAServer sold by Compaq Computer Corp. of Houston, Tex., USA, and user interfaces are placed throughout the manufacturing facility. Technicians operating manufacturing equipment are responsible for obtaining critical dimension measurements and/or other data from material processed in respective work centers and inputting the information into the PROMIS system so as to be available to the process engineers or other personnel associated with the processes.

SAS, on the other hand, is more commonly run on a workstation or personal computer. The data to be analyzed must be stored in the workstation by some means so as to be available for SAS analysis. From the data, SAS generates charts and other forms of outputs to aid a user in understanding the characteristics of the data.

It has been known to use workstation-based applications such as SAS in conjunction with legacy data-collection applications such as PROMIS. The basic operation has been to invoke PROMIS to extract desired data and then invoke SAS to perform a desired analysis on the data and present the results in a desired fashion. The overall process has been cumbersome and inefficient. A user is required to engage in rote dialog with PROMIS to perform the data extraction, manually copy the data from the server to the SAS workstation, perform any necessary file conversions, and invoke SAS in the correct manner to do the desired analysis and presentation. The entire process must be performed for each data set of interest. In a facility such as a semiconductor manufacturing plant, a large number of different processes and associated equipment must be tracked daily just to obtain routine analyses and charts. It is therefore desirable that alternative, more efficient, methods of performing these functions be found.

BRIEF SUMMARY OF THE INVENTION

In accordance with the present invention, methods and apparatus for gathering statistical process control (SPC) information for manufacturing processes and presenting the SPC information to personnel responsible for the manufacturing processes are disclosed. The techniques are flexible and yet highly automated, enhancing the ease and efficiency of their use. Additionally, the SPC information is presented to users in an easy-to-use, hypertext-based form, enabling the users to make even more effective use of the time spent reviewing the gathered data.

The system employs a process information system and an analysis information system. In one embodiment, the process information system includes ALPHAServer computers running the VMS operating system and PROMIS application software, while the analysis information system includes one or more UNIX workstations and SAS application software.

In the analysis information system, a command file is generated including (i) a command for invoking a process data extraction program such as PROMIS using the contents of a script file as input, and (ii) a command for copying an extracted data file generated by the process data extraction program to the analysis information system. Additionally, the script file for use by the process data extraction program is generated. The script file includes a predetermined set of responses to command-line queries automatically generated by the process data extraction program upon its invocation. The information system then issues a command to the process information system indicating that an extraction command routine is to be executed.

The process information system responds to the command by executing the extraction command routine, which routine includes (i) copying the command file from the analysis information system to the process information system, and (ii) executing the command file. This processing results in an extracted data file containing the desired raw data.

After the process information system has completed the data extraction, the analysis information system performs statistical analysis on the extracted data file. Then, for each of several statistical parameters generated by the statistical analysis, a corresponding graphical SPC chart file is created based on the associated data from the statistical analysis. A hypertext summary of the SPC chart files, including hyperlinks thereto, is also created. The graphical SPC chart files and hypertext summaries are then posted in a network-accessible database so as to be easily viewable by the process engineers or other personnel responsible for the manufacturing processes. The overall procedure is repeated for each distinct manufacturing process or work center.

Due to the highly automated nature of the disclosed techniques, a large quantity of process-related data can be collected, analyzed and presented to users with a minimum of human involvement, improving the efficiency and effectiveness of the manufacturing operation.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
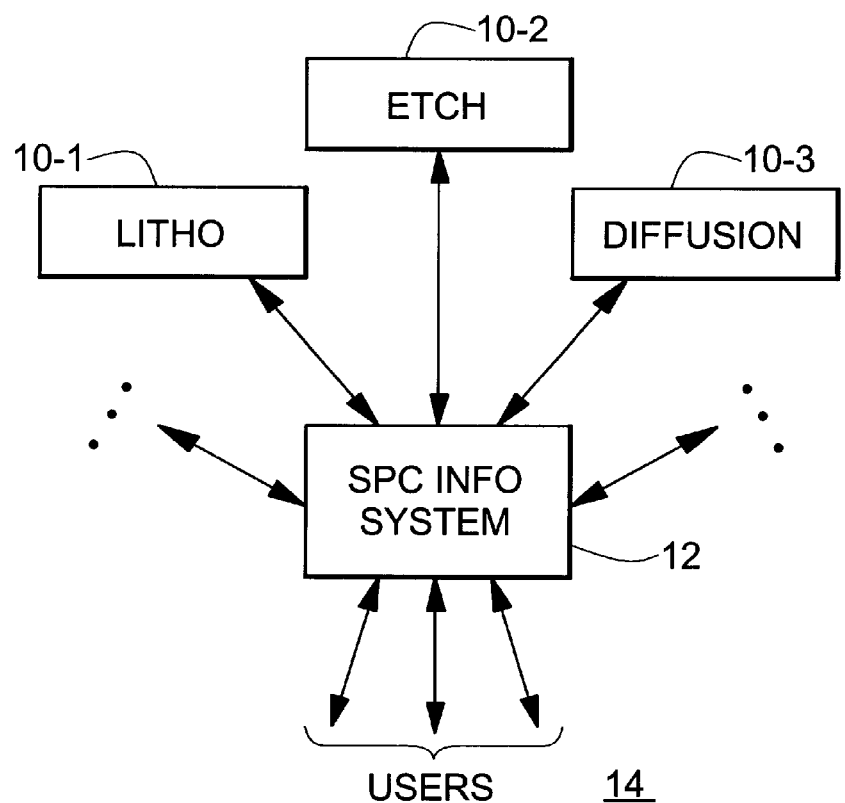
FIG. 1 is a block diagram of a manufacturing environment employing statistical data mining in accordance with the present invention.

In FIG. 1, a number of work centers 10 of a manufacturing facility are coupled to a statistical process control (SPC) information system 12. In particular, the work centers 10 include a lithography (litho) work center 10-1, etch work center 10-2, diffusion work center 10-3, and other work centers (not shown) of a semiconductor manufacturing facility. The SPC information system 12, in turn, has connections to a set of users 14 who use the SPC information system 12 in performing activities pertaining to the respective work centers 10. For example, the users 14 include process engineers who are responsible for the processes performed in the various work centers 10. Process performance is monitored, for example, by taking measurements of critical dimensions (CDs) on semiconductor wafers and die after processing, and this performance data is used to determine whether any changes to the process, including changes in the operating settings of process equipment, are necessary.

The SPC information system 12 includes various data processing equipment and programs for collecting, storing, retrieving, and analyzing raw process data. The raw process data, in turn, enters the SPC information system at the various work centers 10. For example, an operator in the litho work center 10-1 takes CD measurements on wafers after lithographic processing, and enters the measurements into the SPC information system 12 via a computer terminal, workstation, or similar input device. Similar activities occur at the other work centers 10. The manner in which the measurements are taken and the raw data are entered is known in the art.

The users 14 interact with the SPC information system 12 via a hypertext-based or Web-like interface. User-accessible information is organized into a private Web site that can be viewed using a standard browser over a corporate "intranet", for example. At a "home page", the user can indicate which data is to be viewed by clicking on associated hyperlinks. For example, a list the workcenters 10 for which data is available may be presented, and hyperlinks for the workcenters 10 point to the corresponding hypertext summaries of the available data.

Figure 2:
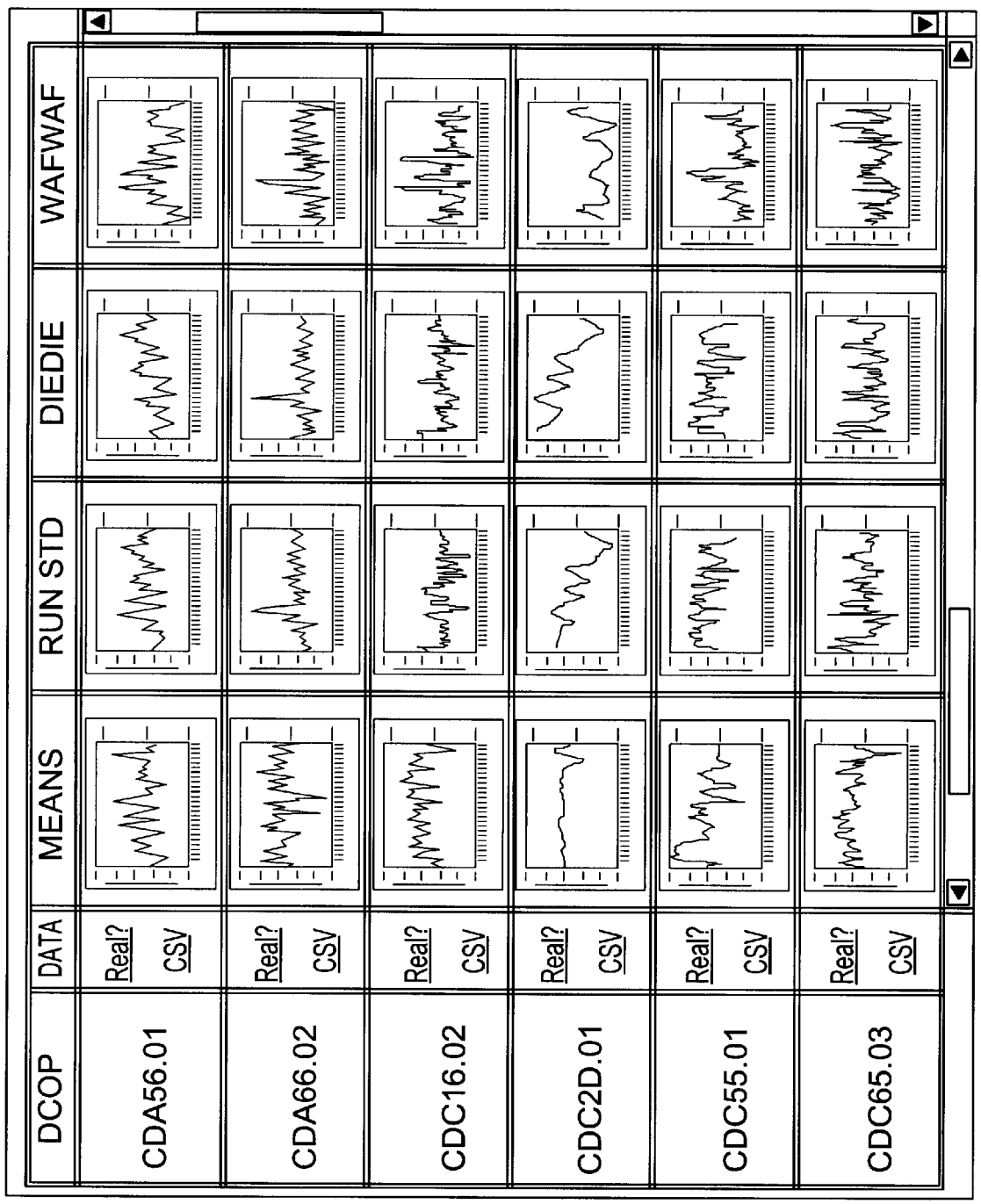
FIG. 2 is a diagram of a hypertext summary page forming part of a user interface to the statistical data mining portion of the manufacturing environment of FIG. 1.

An example of such a hypertext data summary is shown in FIG. 2. Overall, the summary is a table where each row includes data corresponding to a particular data collection operation (DCOP). Each DCOP has a name, such as "CDA68.02", which appears in the cell of the first column. A brief description of the process or work center may also be included in this cell. The column labeled "DATA" has links shown as "Real?" and "CSV". The "Real?" link points to a file containing any bad data that may have been discovered during the statistical analysis, for use by the user 14 in determining the reliability of the results. The "CSV" link points to a comma-separated variables file generated during the statistical analysis, which can serve as input to a spreadsheet or similar analysis program as may be desired by the user 14.

The remaining columns contain thumbnail versions in .GIF format of charts, or plots, of the statistical information derived during analysis. The charts include a chart of means, sigmas, die-to-die sigmas, wafer-to-wafer sigmas, etc. Each chart includes data from a number of different samples as determined by the user. For example, there may be data from a number of different lots, or from all lots during a particular period, etc. Each thumbnail image serves as a hyperlink to an associated full-scale image, which in the illustrated embodiment is stored as a .jpg file.

Figure 3:
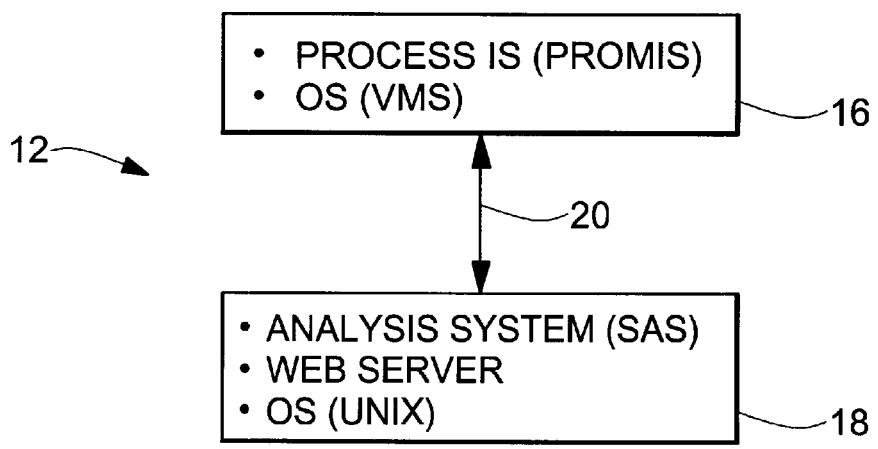
FIG. 3 is a block diagram of a statistical process control (SPC) information system in the manufacturing environment of FIG. 1.

As shown in FIG. 3, the SPC information system 12 includes two sub-systems 16 and 18 linked together by a network 20 over which inter-system communications can occur. The sub-system 16 includes a process information system and an associated operating system (OS). The process information system includes computer software and hardware for collecting, storing, and retrieving process data. In the illustrated embodiment, the process information system employs the PROMIS computer program sold by PRI Automation, Inc. of Billerica, Mass., USA, and the VMS™ operating system and ALPHA™ computers sold by Compaq Computer Corporation of Houston, Tex., USA. In the following description, the term "process information system" is used to refer to both the entire subsystem 16 and the application software (such as PROMIS) that runs on it, apart from the hardware and operating system for example.

The subsystem 18 includes a process data analysis system, a hypertext or Web server, and an operating system. In the illustrated embodiment, the subsystem 18 includes one or more UNIX workstations, such as workstations sold by Sun Microsystems, Inc. of Palo Alto, Calif., USA. The process data analysis system includes a computer program for performing statistical analysis on process data. In the illustrated embodiment, the analysis system employs a widely used program known as Statistical Analysis Software (SAS). In the following description, the term "analysis information system" is used to refer to both the entire subsystem 18 and the application software (such as SAS) that runs on it, apart from the hardware and operating system for example.

Figure 4:
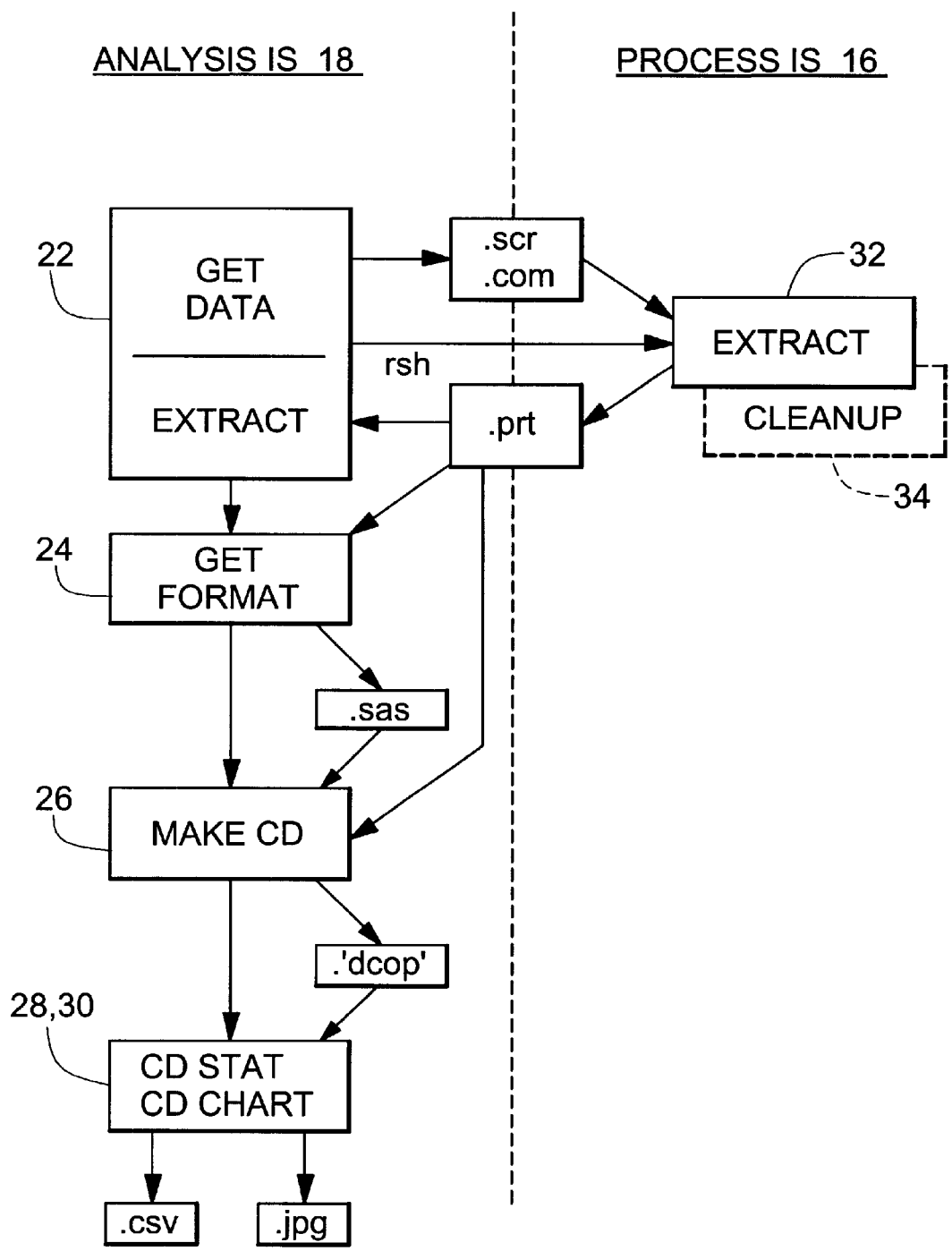
FIG. 4 is a flow diagram depicting core operations of the SPC information system of FIG. 3.

FIG. 4 shows the major functions carried out by the SPC information system 12 of FIGS. 1 and 3. In particular, the functions performed by the analysis information system 18 and the process information system 16, and certain file transfers and other interactions between those systems, are shown. Overall, raw process data is gathered, or "extracted", from the process information system, statistical analysis is performed on the extracted data, and files presenting the results of the statistical analysis (i.e., the graphical charts of FIG. 2) are created. As mentioned above, these files are placed in a browsable collection accessible to the users 14 (FIG. 1). Details of these functions, especially the manner in which the sub-systems 16 and 18 cooperate in performing these functions, are given in the following description.

The functions within the analysis information system 18 include Get Data/Extract 22, Get Format 24, Make CD 26, CD Stat 28 and CD Chart 30. The process information system 16 includes a function shown as Extract 32, which includes "cleanup" functionality 34. Most of the functions shown in FIG. 4 are implemented as macros within SAS, as described more fully below. UNIX routines, VMS command procedures, and PROMIS scripts are also used. The illustrated set of functions is performed for each work center 10 of FIG. 1. A master SAS macro called "CD All" (not shown in FIG. 4) calls each function in turn. The CD All macro can accept input parameters indicating whether certain steps of the process can be omitted. For example, if an input parameter "HasFormat" is true, then the Get Data and Get Format functions 22 and 24 do not require execution.

Specific source code for most of the functions shown in FIG. 4 is given in the Appendix. The first and last lines of the SAS macros are shown in bold in the Appendix for ease of identification.

The Get Data/Extract function 22 includes the SAS macro "get_data", which is shown in the Appendix. "Get data" is the name of generic code that becomes specific code when the user provides values of certain parameters, such as "dir" and "dcop". The parameter "dir" specifies a directory, and "dcop" specifies the name of a data collection operation. In the rest of the description, these parameters are assumed to have been given the values "etch6" and "cda68.02" respectively by the SAS user.

SAS uses the "X" command to invoke a UNIX command that follows from within a SAS session. In this case, the Unix command becomes:

extract cda68.02/db/spc_charts/etch6/

This command invokes a UNIX routine named "extract", which is described in more detail below. Ultimately, it results in i) a call to PROMIS to extract data about the "cda68" wafer lots that have been processed within the last 60 days, ii) subsequent transfer of the extracted data via File Transfer Protocol (FTP) from the process information system 16 to the file "/db/spc_charts/etch6/cda68.prt" in the analysis information system 18. It is possible that the connection between VMS, FTP and UNIX is not stable while the data is being extracted and transferred. Thus, it is verified that the file cda68.prt actually exists in /db/spc_charts. The flag variable "noprt" is set to indicate whether or not the file has been successfully created, and a statement is put into a log file by a % put command. As described below, the flag variable "noprt" is used by subsequent routines.

The "extract" portion of the Get Data/Extract function 22 includes the following UNIX routine:

```
set dcop=$1
set name=$1:r
set dir=$2
echo "da da eng">>/home/joshm/docj.scr
echo $dcop>>/home/joshm/docj.scr
echo "y">>/home/joshm/docj.scr
echo "-60">>/home/joshm/docj.scr
echo "Y">>/home/joshm/docj.scr
echo "now">>/home/joshm/docj.scr
echo "all">>/home/joshm/docj.scr
echo "n">>/home/joshm/docj.scr
echo "y">>/home/joshm/docj.scr
echo $name>>/home/joshm/docj.scr
echo "tres">>/home/joshm/docj.scr
echo "eqpid enttime 4">>/home/joshm/docj.scr
echo "end">>/home/joshm/docj.scr
echo "end">>/home/joshm/docj.scr
echo "B">>/home/joshm/docj.scr
echo "end">>/home/joshm/docj.scr
echo "B">>/home/joshm/docj.scr
echo "YES">>/home/joshm/docj.scr
echo "NO">>/home/joshm/docj.scr
echo "Print">>/home/joshm/docj.scr
echo $name>>/home/joshm/docj.scr
echo "no">>/home/joshm/docj.scr
echo $name>>/home/joshm/docj.scr
echo "quit">>/home/joshm/docj.scr
echo "return">>/home/joshm/docj.scr
```

The "set" keyword in Unix assigns meaning to a variable. In this case, "dcop" is assigned the value of the first string that follows the keyword "extract" on the command line. Hence, in this case, dcop=cda68.02

Similarly, "name" is assigned a value equal to the first part of the string "cda68.02", which is "cda68". "dir" is assigned the value of the second variable in the command, which is "etch6".

The keywords "echo" and ">>" together tell UNIX that contents of the given string (e.g., "da da eng") are to be copied onto the designated file (in this case, the script file "docj.scr" in the directory /home/joshm). This script file is to be used to provide the user responses to PROMIS dialogue for extracting data into a VMS file.

In response to the user input, "da da eng", PROMIS asks the name of the data collection operation (or "dcop"). That name is stored as the value of a Unix variable, $dcop. The second "echo" command tells UNIX to copy the value of the variable $dcop (which is "cda68.02") to the next line of the file "docj.scr".

The remaining lines provide additional input for PROMIS dialog as follows, where a PROMIS question is followed by the input from the script file in parentheses:

Wish to specify a starting time to search from? (y)
How many days? (last 60)
Specify ending time? (y)
Ending date/time? (now)
Select range of sites (all) [this answer avoids the problem of a specific number of sites 3, 5, 9, etc.]
Apply search criteria? (n)
Specify additional display/search criteria? (y)
Work file name to store this information? ($name=value of name=cda68)
PROMIS file where the necessary information is stored? (tres)
Enter display field? (eqpid enttime 4) [where "4" specifies a date format]
Enter display field? (end)
Enter file for display criteria? (end)
Begin next phase? (B)

Enter a file for search criteria? (end)

Begin next phase? (B)

Proceed with search? (YES)

Add comments to work file? (NO)

At this point during the actual execution, PROMIS will proceed with the data extraction. Then, in the last several lines, PROMIS is instructed to print the results to a file "cda68.prt". The two commands "quit" and "return" cause PROMIS to terminate and control to be returned to the calling entity, which as described below is a VMS command procedure that is also custom-made for each data extraction operation.

After the script file docj.scr has been created in the UNIX directory /home/joshm of the analysis information system 18, it is transported to the process information system 16 for use in controlling a PROMIS session. A VMS command file shown as "docj.com" is created to store post-extraction instructions. In the following, VMS commands are those appearing with a "$" as the initial character for each command line.

```
echo '$rcp
    spacer.eng.utr.ti.com::   "/home/joshm/
    docj.scr"docj.scr'
>>/home/joshm/docj.com
echo '$@MEP:pcl @docj.scr'>>/home/joshm/docj.com
echo '$if f$search("'$name'.prt").nes. "" then rcp
'$name'.prt spacer.eng.utr.ti.com:: "'$dir$name'.prt"'>>
/home/joshm/docj.com
echo '$if f$search("'$name'.prt").nes. "" then delete
'$name'.prt;*'>>/home/joshm/docj.com
echo '$if f$search("'$name'.tab").nes. "" then delete
'$name'.tab;*'>>/home/joshm/docj.com
echo '$if f$search("'$name'.des").nes. "" then delete
'$name'.des;*'>>/home/joshm/docj.com
rsh mantis.adm.utr.ti.com
    '@disk$disk21:[joshm]extract.com'
```

The command "rcp" is a UNIX remote copy command. The first line in the docj.com file is a request to make a remote copy of docj.scr onto the VMS machine in the process information system 16.

The next command, "@MEP:pcl @docj.scr", tells VMS to execute the PROMIS script docj.scr, which results in the PROMIS data extraction being performed as described above. Then if the data file cda68.prt is not empty, that file is rcp'd to the workstation spacer.eng.utr.ti.com in the analysis information system 18. Once this file transfer occurs, the cda68.prt file is deleted from VMS to conserve disk space. The files cda68.tab and cda68.des, which are created by PROMIS to keep track of data format, are also deleted.

Both the docj.scr and docj.com files are made in UNIX, and these two files are "dynamic" in that they change with each data collection operation. A static VMS command file, extract.com, is used for each operation. The "rsh" command tells the process information system 16 to execute this command file. Extract.com begins by remote copying the docj.com file from UNIX, and then executes commands from that file. Afterward, extract.com purges all old versions of any files, and resets the version number of docj.com and docj.scr to 1. In short, it does all the "clean up" needed to ensure smooth running of this extraction/transportation engine.

Returning to the SAS functions of the analysis information system 18, the Get Format function 24 is a SAS macro that determines the format or structure of the data in the 'dcop'.prt file. It does this by reading the "header"=first line of the file and processing it according to the code shown in the Appendix. Once the format has been determined, the Get Format routine 24 generates a script called "make_dcop.sas" containing information instructing SAS how to read the dcop.prt file and make a dataset from which the statistical analysis and charting proceeds.

The routine Make CD 26 (also shown in the Appendix) converts the data set made by Get Format into another data set, "sasuser.dcop", in a standard form where information about each process lot is stored on one line. There are as many lines in this data set as the number of lots in the incoming .prt file. The Make CD routine 26 also determines whether any of the incoming observations have unreasonable values, and stores such lots in a data set called "bad". This information is made available to the users 14.

The CD Stat routine 28 (also shown in the Appendix) computes lot statistics that are eventually used to make charts. These statistics include average and sigma of each wafer, sigma between wafer means in each lot, average of wafer sigma's in each lot, average of each lot, sigma of each lot, and range (high—low) for each lot. The resulting data set is given the name "dir.dcop", for instance, "etch6.cda68".

CD Stat also creates a "dcop.csv" file that contains the lot-by-lot information in a spreadsheet format so that the users 14 can carry out independent analyses of their process data if they so desire.

The CD Chart routine 30 (also shown in the Appendix) makes an SPC chart for each parameter (lot mean, lot sigma, sigma of wafer means in each lot, average of wafer sigma's in each lot, and the range of each lot). The chart exists as a .jpg file that is made accessible to the users 14. A thumbnail file (in .gif format) is created from the .jpg file, and the thumbnail file is placed on a hypertext summary page that can be browsed by the users 14 (see FIG. 2). A hyperlink on the summary page takes the user to the .jpg file.

The technique of remotely connecting to PROMIS in VMS from a SAS session in UNIX depends on the reliability of network connections. SAS is capable of remembering values of macro parameters from one macro to next. While this ability is generally advantageous, it can lead to the creation of incoherent data when there are disruptions in the network connections. To minimize the chances of such problems, the SAS session is divided into a sequence of brand-new "child" SAS sessions—one for each dcop—from a "mother" SAS session. The SAS code is as follows:

```
% macro fablines;
data_null_;
    if 0 then set sasuser.lot_spc point=_n_ nobs=nobs;
    call symput('lines',nobs);
    stop;
run;
% do i=1% to &lines;
data null;
    file "lot_spc.sas";
    put '% include cd_all.sas";';
    i=SYMGET ("i")+0;
    length name $40;
    b=0;
    set sasuser.lot_spc point=i;
    array char(*)_CHARACTER_;
    array num(*)_NUMERIC_;
    put '% cd_all(';
    do a=2 to dim(char);
```

```
    if compress(char(a))^="" then
    do;
       call VNAME(char(a),name);
       if name ^='__OBSTAT__' then
       do;
          b=b+1;
          if b=1
             then put name '=' char(a)+(-1);
             else put ',' name '=' char(a)+(-1);
       end;
    end;
  end;
do a=2 to dim(num);
  if compress(num(a)) ^="." then
  do;
    call vname(num(a),name);
    put ',' name '=' num(a);
  end;
   end;
   put ');';
   stop;
  run;
run
X sas lot_spc.sas;
X more lot_spc.log >>dcops.log;
% end;
% MEND fablines;
```

The macro "fablines" is a routine that generates a sequence of "child" SAS sessions, waiting for each session to finish before generating the next session, etc. A data set named, "lot_spc", is used to store information about the specific work center name, the name of the dcop, whether SPC limits exist, etc. The number of lines in that data set is counted; each line generates one SAS session.

Each "put" statement adds a parameter to "lot_spc.sas" that is needed to invoke a call to a routine cd_all.sas. SAS recognizes two kinds of array variables, character and numeric. All of the parameters that have character values are first recognized (examples include Lot_ID, Wafer, Site, etc.). A blank represents a missing value of a character parameter.

Next, all parameters that have numerical values are identified (examples include starting date, ending date, hasdata (binary), haslimit (binary), etc.). A dot (.) represents a missing value for a numerical parameter.

The 'X' command submits the SAS code in the file lot_spc.sas for execution in the batch mode. The contents of the SAS log file (where details of how the work gets done are stored) are stored into a larger file "dcops.log". The overall "do loop" is repeated for each dcop. The % MEND statement ends the definition of macro "fablines". The macro is then executed by the SAS statement "fablines".

The above process for collecting data for multiple fab lines and creating the charts can advantageously be controlled from a batch job that is scheduled to run periodically at a convenient time. For example, it may be scheduled to run once daily at an early-morning time as 2:00 A.M. This additional automation step enables the users 14 to employ a routine in checking their respective charts and other data, while further eliminating human involvement for routine operations.

It will be apparent to those skilled in the art that other modifications to and variations of the disclosed methods and apparatus are possible without departing from the inventive concepts disclosed herein, and therefore the invention should not be viewed as limited except to the full scope and spirit of the appended claims.

What is claimed is:

1. A method of gathering statistical process control (SPC) information for a manufacturing process and presenting the SPC information to personnel responsible for the manufacturing process, comprising:
   (1) in an analysis information system,
      (A) automatically generating a text command file including (i) a text command for invoking a process data extraction program using the contents of a text script file as input, the process data extraction program storing raw data reflecting the performance of the manufacturing process with respect to predetermined process parameters, and (ii) a text command for copying an extracted data file generated by the process data extraction program to the analysis information system,
      (B) automatically generating the script file for use by the process data extraction program, the script file including a predetermined set of text responses to command-line queries automatically generated by the process data extraction program upon its invocation, and
      (C) automatically issuing a command to a process information system indicating that an extraction command routine is to be executed;
   (2) in the process information system, responding to the command from the analysis information system by automatically executing the extraction command routine, which routine includes (i) copying the command file from the analysis information system to the process information system, and (ii) executing the text commands appearing in the command file; and
   (3) in the analysis information system,
      (D) automatically performing statistical analysis on the extracted data file resulting from the execution of the extraction command routine, the statistical analysis resulting in data for a plurality of statistical parameters for the manufacturing process,
      (E) for each statistical parameter, automatically creating a corresponding graphical SPC chart file based on the associated data from the statistical analysis,
      (F) automatically creating hypertext summary information about the SPC chart files created for the manufacturing process, the hypertext summary including navigable links to the graphical SPC chart files, and
      (G) automatically posting the graphical SPC chart files and hypertext summary information in a network-accessible database so as to be available to the personnel responsible for the manufacturing process.

2. A method according to claim 1, wherein the extracted data file is organized in one of a plurality of possible formats, and further comprising determining the format of the data file in preparation for performing the statistical analysis and chart file creation.

3. A method according to claim 1, further comprising, in the analysis information system, creating a spreadsheet input file for each statistical parameter, the spreadsheet input file also being posted in the network-accessible database and being accessible via a navigable link included with the hypertext summary information.

4. A method according to claim 1, wherein the hypertext summary information includes thumbnail versions of the graphical SPC charts.

5. A method according to claim 1, further comprising determining, at the analysis information system, whether a user has indicated that the extracted data file already exists, and wherein the command to the process information system indicating that the extraction command routine is to be executed is issued only if the user has not indicated that the extracted data file already exists.

6. A method according to claim 1, wherein the steps performed in the analysis information system are performed as part of a batch process scheduled to run at predetermined regular times.

7. A method of obtaining statistical process control information for a plurality of manufacturing processes, comprising:
(1) automatically generating a text script file for use by a statistical analysis program, the script file including a plurality of text macro commands and associated parameters, each macro command invoking the same master macro with a set of parameters identifying a corresponding different one of the manufacturing processes, the master macro being operative to
(A) invoke a process data extraction program to obtain an extracted data file containing data reflecting the performance with respect to predetermined process parameters of the manufacturing process identified by the parameters with which the master macro is invoked, and
(B) invoke a statistical analysis macro to perform statistical analysis on the extracted data file resulting from the execution of the process data extraction program; and
(2) automatically invoking the statistical analysis program with the script file.

* * * * *